(12) United States Patent
Guha et al.

(10) Patent No.: US 11,125,773 B2
(45) Date of Patent: Sep. 21, 2021

(54) APPARATUS AND METHODS FOR QUANTUM BEAM TRACKING

(71) Applicant: Xanadu Quantum Technologies Inc., Toronto (CA)

(72) Inventors: Saikat Guha, Tucson, AZ (US); Haoyu Qi, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 0 days.

(21) Appl. No.: 16/922,158

(22) Filed: Jul. 7, 2020

(65) Prior Publication Data

US 2021/0033640 A1 Feb. 4, 2021

Related U.S. Application Data

(60) Provisional application No. 62/882,195, filed on Aug. 2, 2019.

(51) Int. Cl.
*G01Q 20/00* (2010.01)
*G01Q 20/02* (2010.01)
*G01Q 60/24* (2010.01)

(52) U.S. Cl.
CPC ............. *G01Q 20/02* (2013.01); *G01Q 60/24* (2013.01)

(58) Field of Classification Search
CPC ........ G01Q 10/00; G01Q 10/02; G01Q 10/04; G01Q 10/045; G01Q 10/05; G01Q 10/06; G01Q 10/065; G01Q 20/00; G01Q 20/02; G01Q 20/04; G01Q 60/00; G01Q 60/24; G01Q 60/18; G01Q 60/20
USPC ..................... 850/1, 2, 3, 4, 5, 6, 7; 250/251
See application file for complete search history.

(56) References Cited

U.S. PATENT DOCUMENTS

| | | | |
|---|---|---|---|
| 8,849,124 B2* | 9/2014 | Guha | H04B 10/70 398/140 |
| 2008/0310000 A1* | 12/2008 | Beausoleil, Jr. | G06N 10/00 359/108 |
| 2018/0195983 A1* | 7/2018 | Hollenberg | G01R 33/323 |
| 2020/0025563 A1* | 1/2020 | Liu | G01C 1/00 |

* cited by examiner

*Primary Examiner* — Nicole M Ippolito
(74) *Attorney, Agent, or Firm* — Cooley LLP

(57) ABSTRACT

A method includes sending a probe beam into a beam path that induces a lateral displacement to the probe beam. The probe beam includes a plurality of orthogonal spatial modes that are entangled with each other. The method also includes measuring a phase of each spatial mode from the plurality of orthogonal spatial modes in the probe beam at a detector disposed within a near field propagation regime of the probe beam. The method also includes estimating the lateral displacement of the probe beam based on a phase of each spatial mode from the plurality of spatial modes in the probe beam after the beam path.

22 Claims, 6 Drawing Sheets

500

510 — Send a probe beam into a beam path that induces a lateral displacement to the probe beam, the probe beam including a plurality of orthogonal spatial modes that are entangled with each other 520 — Measure a phase of each spatial mode from the plurality of orthogonal spatial modes in the probe beam at a detector disposed within a near field propagation regime of the probe beam 530 — Estimate the lateral displacement of the probe beam based on a phase of each spatial mode from the plurality of spatial modes in the probe beam after the beam path.

APPARATUS AND METHODS FOR QUANTUM BEAM TRACKING

CROSS-REFERENCE TO RELATED APPLICATIONS

This application claims priority to and benefit of U.S. Provisional Patent Application No. 62/882,195, filed Aug. 2, 2019 and titled "APPARATUS AND METHODS FOR QUANTUM BEAM TRACKING," the entire content of which is herein incorporated by reference in its entirety, for all purposes.

FIELD

One or more embodiments relate to quantum beam tracking.

BACKGROUND

Accurate estimation of a small transverse displacement of an optical beam (i.e., beam tracking) can benefit many practical applications, such as ultra-stable beam pointing, acquisition and tracking for space-based laser communications, light detection and ranging (LIDAR) receivers, precision guided munitions, ultra-weak absorption measurements, and single-molecule tracking in biological imaging and atomic force microscopy, among others. Existing beam tracking devices usually use classical light as the probe beam and measure the beam displacement based on the phase of the probe beam. The precision of these measurements are generally restrained by the shot noise limit and therefore may not be sufficient for certain applications.

SUMMARY

Some embodiments described herein relate generally to quantum beam tracking, and, in particular, to measurement of lateral displacement in an optical beam using entangled light. In some embodiments, a method includes sending a probe beam into a beam path that induces a lateral displacement to the probe beam. The probe beam includes a plurality of orthogonal spatial modes that are entangled with each other. The method also includes measuring a phase of each spatial mode from the plurality of orthogonal spatial modes in the probe beam at a detector disposed within a near field propagation regime of the probe beam. The method also includes estimating the lateral displacement of the probe beam based on a phase of each spatial mode from the plurality of spatial modes in the probe beam after the beam path.

In some embodiments, a system includes a transmitter configured to send a probe beam into a beam path that induces a lateral displacement to the probe beam. The probe beam includes a plurality of orthogonal spatial modes that are entangled with each other. The system also includes a receiver configured to be in optical communication with the transmitter and configured to measure a phase of each spatial mode from the plurality of orthogonal spatial modes in the probe beam. The receiver is disposed within a near field propagation regime of the probe beam. The system also includes a processor operatively coupled to the receiver configured to estimate the lateral displacement of the probe beam based on a phase of each spatial mode from the plurality of orthogonal spatial modes in the probe beam after the beam path.

In some embodiments, a method includes sending, using a transmitter having a first pupil area $A_t$, a probe beam in a displaced squeezed state into a beam path that induces a lateral displacement to the probe beam. The probe beam includes a plurality of orthogonal spatial modes and a plurality of orthogonal temporal modes. Each spatial mode in the plurality of orthogonal spatial modes and each temporal mode in the plurality of orthogonal temporal modes is entangled with another mode in the plurality of orthogonal spatial modes and the plurality of orthogonal temporal modes. The method also includes measuring a phase of each spatial mode and each temporal mode in the probe beam using a receiver having a second pupil area $A_r$. $A_t A_r/(\lambda L)^2$ is no less than 5, where $\lambda$ is a central wavelength of the probe beam and L is a length of the beam path. The method also includes estimating, using a processor, the lateral displacement of the probe beam based on the phase of each spatial mode and each temporal mode in the probe beam after the beam path to produce an estimation of the lateral displacement having a standard deviation substantially equal to $1/\sqrt{M_s} \times 1/PT$, where $M_s$ is a number of orthogonal spatial modes in the probe beam, P is a power of the probe beam, and T is a time duration of the probe beam.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

To overcome the shot noise limit in existing beam tracking techniques, one or more methods, apparatus, and systems described herein employ a quantum probe beam and perform the measurement within the near field propagation regime of the probe beam. Transverse displacement (also referred to as lateral displacement) within the probe beam can be treated as a transformation performed by an array of nested Mach-Zehnder interferometers. In some embodiments, the probe beam is entangled across the spatial modes within the Fresnel number product of the propagation geometry and is also entangled across the temporal modes within the time-bandwidth product of the beam. The measurement sensitivity (also referred to as measurement precision) in these embodiments can achieve a Heisenberg-limited scaling over both the number of temporal modes and the average number of photons transmitted per mode. The scaling over the number of spatial modes in the probe beam can even reach a sub-Heisenberg limit. In quantum metrology (e.g., interferometry), the Heisenberg limit is regarded as the optimal rate at which the accuracy of a measurement can scale with the energy used in the measurement. Therefore, the quantum beam tracking technology described herein breaks the precision limit as recognized by the industry and achieves unexpected results.

Figure 1A:
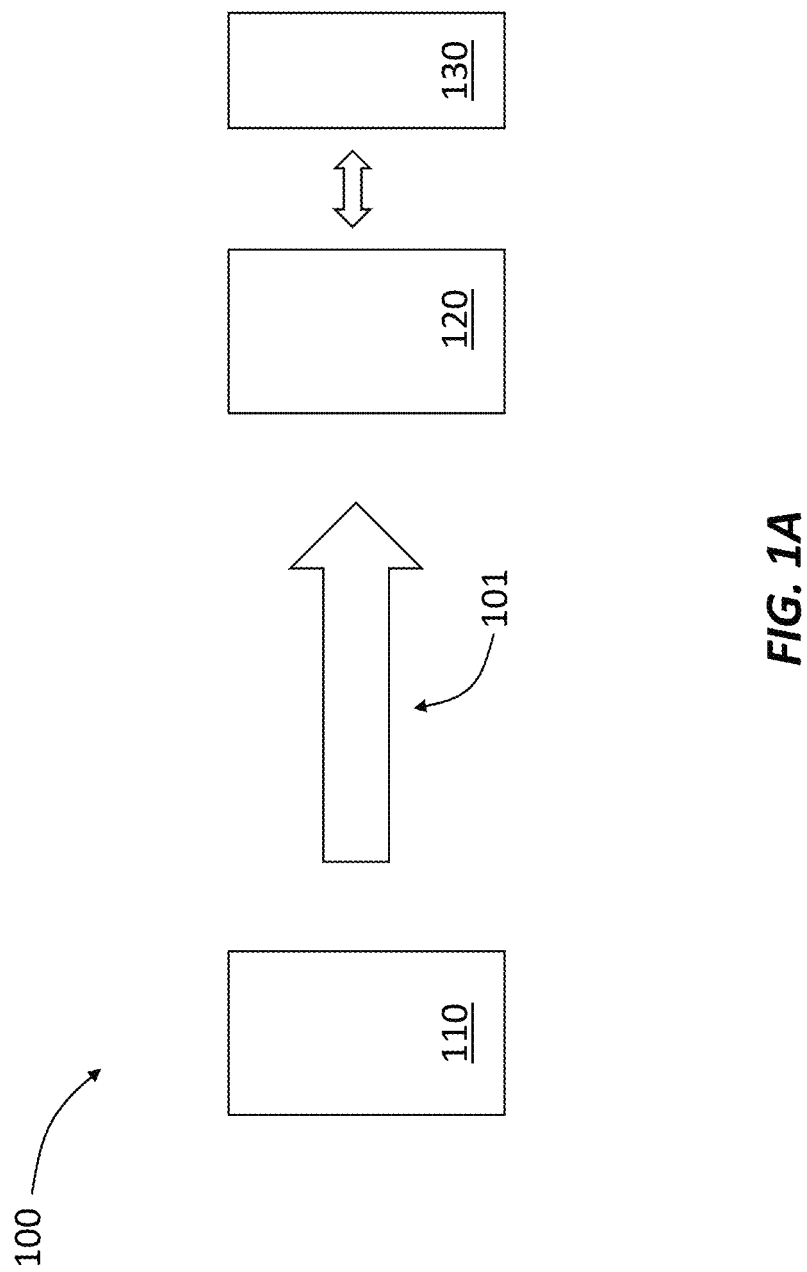
FIGS. 1A-1B illustrate a system for quantum beam tracking, according to an embodiment.
Figure 1B:
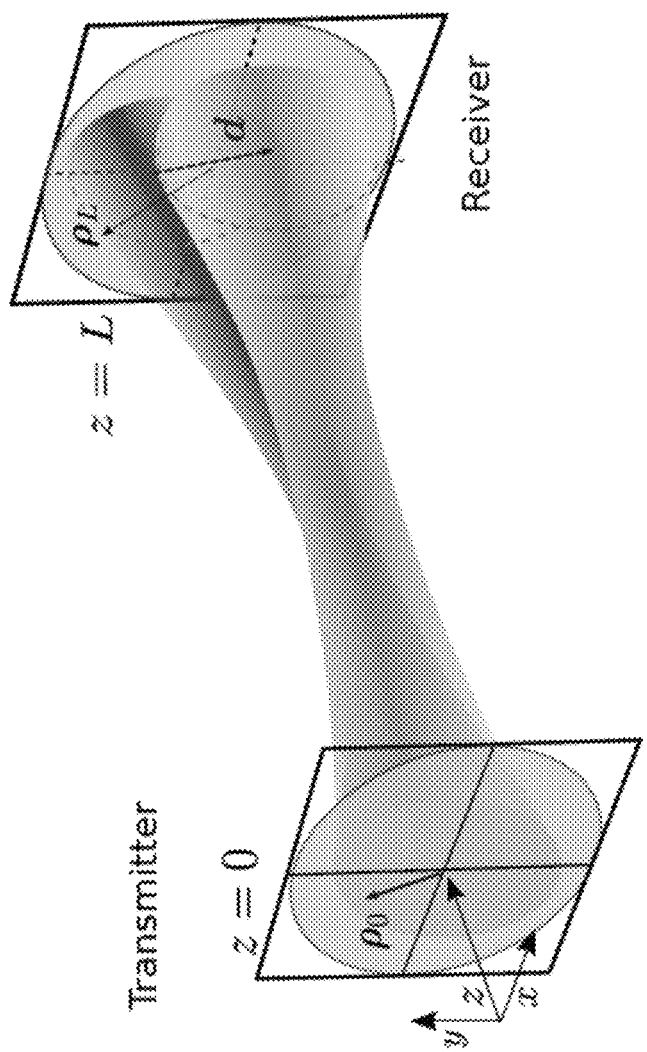

FIG. 1A shows a schematic of a system 100 for quantum beam tracking, according to an embodiment. FIG. 1B illustrates the geometries of the system 100. The system 100 includes a transmitter 110 to send a probe beam 101 into a beam path that induces a lateral displacement d to the probe beam 101. The probe beam 101 includes multiple orthogonal spatial modes that are entangled with each other. The system 100 also includes a receiver 120 in optical communication with the transmitter 110 to measure the phase of each spatial mode in the probe beam 101 at a location within a near field propagation regime of the probe beam 101. The measured phase of each spatial mode is processed by a processor 130 (e.g., a classical computer), operatively coupled to the receiver 120, to estimate the lateral displacement d.

Without being bound by any particular theory or mode of operation, the near field propagation regime of the probe beam 101 can be defined in term of the parameter $D \equiv A_t A_r/(\lambda L)^2 \gg 1$, where $A_t$ is the pupil area (also referred to as the aperture) of the transmitter 110, $A_r$ is the pupil area of the receiver 120, $\lambda$ is the center wavelength of the probe beam 101, and L is the length of the beam path between the transmitter 110 and the receiver 120. FIGS. 1A-1B shows a straight line beam pulse for illustrative purposes only. In practice, the beam path of the probe beam 101 can include any shape. In some embodiments, the parameter D is no less than 5 (e.g., about 5, about 10, about 15, or greater) such that the receiver 120 is located within the near field propagation regime of the probe beam 101.

In some embodiments, the transmitter 110 is configured to provide the probe beam 101 that is in a displaced squeezed state (see, e.g., FIGS. 3-4 below). In some embodiments, the transmitter 110 is configured to provide the probe beam 101 that also includes multiple orthogonal temporal modes, and each temporal mode is entangled with another temporal mode. In some embodiments, the probe beam 101 includes both orthogonal spatial modes and orthogonal temporal modes, and each mode (spatial or temporal) is entangled with another mode (spatial or temporal).

In some embodiments, the probe beam 101 can include multiple orthogonal temporal modes and includes only one spatial mode (i.e., $M_s=1$). In some instances, the system 100 can be configured to operate in the far field propagation regime of the probe beam 101 In the far field regime (e.g., $A_t A_r/(\lambda L)^2 < 1$). In these instances, the probe beam 101 can include only one spatial mode.

In some embodiments, the number of orthogonal spatial modes in the probe beam 101 can depend on the dimensions (e.g., $A_t$, $A_r$) of the transmitter 110 and/or the receiver 120. In some embodiments, the number of orthogonal spatial modes can be about $A_t A_r/(\lambda L)^2$. For example, for L=1 km, $\lambda_t = A_r = 10$ cm, $\lambda = 1550$ nm, the number of spatial modes can be about 25.

The number of temporal modes in the probe beam can be a function of the probing duration and optical bandwidth of the source. For example, a squeezed light source based on spontaneous parametric down-conversion (SPDC) can produce light beams at 1550 nm with about 2 THz of optical bandwidth around the center wavelength. For a 10 nanoseconds beam, the number of temporal modes can be about 20,000.

The processor 130 in the system 100 can include any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

As discussed above, the system 100 illustrated in FIGS. 1A-1B can achieve the unexpected result of sub-Heisenberg limit in measurement precision. The precision of optical sensors, including both active sensors (e.g., laser gyroscopes, LIDARs, atomic-force microscopes, and laser vibrometers) and passive sensors (e.g., fluorescence microscopy, astronomical imaging, and satellite based remote sensing), can be quantified as the standard deviation $\delta\theta$ of the measurement of desired scene parameter(s) $\theta$ (e.g., lateral displacement d) versus the total mean photon number N (or optical power) collected over the receiver's integration time. The precision limit, i.e., the optimal scaling of $\delta\theta$ versus N achievable by using the optimal probe beam and the receiver, given the physical constraints of the application scenario, is usually governed by quantum mechanics.

In some instances, multiple sensors that have different views of the same scene can improve the measurement precision using pre-shared entanglement across these sensors. For example, when using M distributed sensors to sense one aggregate parameter $\theta$ (e.g., phase modulation) of a scene, the pre-shared entanglement among these M sensors can help improve the sensing precision by a factor of $M^{1/2}$. In this instance, for a total of N probe photons expended across M distributed sensors, individual (non-entangled) quantum sensors can obtain a standard deviation $\delta\theta$ at about $M^{3/2}/N$. In comparison, a probe entangled across those M sensors can have $\delta\theta$ at about M/N, i.e., an improvement by a factor of $M^{1/2}$.

In some instances, the entanglement-assisted improvement of measurement precision can also be achieved by using a probe beam having entanglement across multiple orthogonal spatio-temporal modes of the probe field. Each mode can be non-trivially modulated by the target parameter of interest $\theta$ (e.g., the lateral displacement d). Quantitative results of measurement precision in quantum sensing using an entangled probe beam is presented herein using the system 100 as an example.

In some instances, the system 100 can employ the multi-sensor approach described above. In this approach, the system 100 can include multiple transmitters, each of which is sending a corresponding beam towards the same target (but the angle can be different). Without being bound by any particular theory or mode of operation, increasing the number of transmitters (and accordingly the number of probe beams) can have similar effects as increasing the number of temporal modes, thereby increasing the measurement precision.

In the system 100 illustrated in FIGS. 1A-1B, within the near field propagation regime (i.e., $D \gg 1$), the total number of near-unity-transmissivity orthogonal spatial modes $M_s$ in the probe beam 101 can be approximately equal to D. The total number of near-unity-transmissivity orthogonal temporal modes $M_s$ can be approximately equal to WT, where W is the bandwidth of the probe beam 101 in [Hz], and T is the time duration of the probe beam 101. Each mode (spatial or temporal) in the probe beam 101 can have a mean photon number of $\bar{n}$, so the total number of photons N in the probe beam 101 is N=$\bar{n}M_S M_T$, and the optical power of the probe beam P (also referred to as transmit power P) is P=$\bar{n}M_S$W. The power P in Watts can be written as P(hc/λ), where hc/λ is the photon energy at wavelength λ.

For comparison, the measurement precision of a classical probe beam is provided first. In this instance, the transmitted light can be expressible as a statistical mixture of coherent states of the M spatio-temporal modes (i.e., have a proper P-function representation), and the standard deviation δd can be written as:

$$\delta d \sim \frac{1}{(\sqrt{M_T} M_S \sqrt{\bar{n}})} = \frac{1}{\sqrt{M_S}} \times \frac{1}{\sqrt{PT}} \quad (1)$$

In some embodiments, the probe beam 101 includes only spatially entangled modes and does not include entanglement across temporal modes. In these embodiments, the measurement precision can be written as:

$$\delta d \sim \frac{1}{(\sqrt{M_T} M_S^{2/3} \bar{n})} = \frac{W}{\sqrt{M_S}} \times \frac{1}{P\sqrt{T}} \quad (2)$$

In some embodiments, the probe beam 101 includes both spatially entangled modes and temporally entangled modes, i.e., entanglement across all $M_S$ spatial modes and $M_T$ temporal modes. In these embodiments, the measurement precision can be written as:

$$\delta d \sim \frac{1}{(M_T M_S^{2/3} \bar{n})} = \frac{1}{\sqrt{M_S}} \times \frac{1}{PT} \quad (3)$$

Equations (1)-(3) express δd in each scenario (i.e. classical probe beam, spatially entangled probe beam, and spatio-temporally entangled probe beam) in two equivalent forms. The first form shows the scaling of the standard deviation δd versus the number of spatial modes $M_S$, the number of temporal modes $M_T$, and the mean photon number per mode $\bar{n}$. Equation (1) shows that the measurement precision δd of a classical probe beam scales with 1/$\sqrt{\bar{n}}$, which is also known as the standard quantum limited (SQL) sensitivity. In contrast, the probe beam 101 having spatially entangled modes can achieve a measurement precision that scales with 1/$\bar{n}$, which is also known as Heisenberg limited (HL) sensitivity and has an $\sqrt{\bar{n}}$ improvement over the SQL.

For the probe beam 101 having both spatial and temporal entanglement, in addition to this Heisenberg limited sensitivity in $\bar{n}$, Equations (3) also shows the scaling of δd versus the number of entangled spatial modes (from 1/$M_S$ in classical case to 1/$M_S^{2/3}$) and the number of entangled temporal modes (from 1/$\sqrt{M_T}$ in classical case to 1/$M_T$). In these instances, the measurement precision achieves an unconventional quantum improvement with respect to the number of spatial modes $M_S$. Without being bound by any particular theory or mode of operation, such improvement can be attributed to the effects of how the beam displacement appears as a progressively higher phase modulation in an effective Mach-Zehnder array representation of the modal modulation caused by beam displacement, as the entanglement shifts to higher-order spatial modes (see, e.g., FIG. 2 and associated descriptions below).

The second form of Equations (1)-(3) that show the scaling of δd can be used for operational purposes. In some instances, the number of near-unity-transmissivity spatial modes $M_S$ is a fixed parameter determined by the channel geometry (e.g., shape/dimension of the transmitter and/or the receiver), so $M_S$ is treated as a constant in this form. In addition, the center wavelength λ and the total optical bandwidth W are also treated as constants in a given system. In contrast, a user usually has flexibility to control the transmit power P and the interrogation time T (i.e., pulse duration of the probe beam 101). Stated differently, a user of the system 100 can adjust the transmit power P and the interrogation time T to achieve a desired measurement precision. For a classical probe beam, δd~1/$\sqrt{PT}$ (i.e., SQL), whereas for the optimal spatiotemporally entangled sensor, δd~1/PT (HL). A probe that is only entangled in spatial modes but not in temporal modes achieves an intermediate precision, i.e., δd~1/P$\sqrt{T}$.

The system 100 illustrated in FIGS. 1A-1B can be constructed in various ways (e.g., using different types of transmitters 110 and/or different types of receivers 120). To construct a system for a particular application (e.g., measuring the motion of the cantilever in an atomic force microscope, or AFM), it would be helpful to analyze the quantum model underlying the task of measuring lateral displacement in an optical beam.

The quantum model includes a line-of-sight free-space diffraction-limited optical transmission between a circular-shaped transmitter (e.g., 110 in FIG. 1A) having a radius of $r_T$ and a circular-shaped receiver (e.g., 120 in FIG. 2) having a radius of $r_R$. An optical source in the transmitter produces a quasi-monochromatic quantum field $\hat{E}$ (r, t) at a center wavelength λ, and optical bandwidth W. The quantum field is spatially limited to the exit aperture of the transmitter pupil, i.e., {$\rho_0$: |$\rho_0$|≤$r_T$}. The quantum field is temporally limited to the time interval, i.e., {t: $t_0$−T≤t≤$t_0$}. The quantum model uses r=(x, y, z) for 3D spatial coordinates and $\rho_u$=(x, y) for the transverse spatial coordinates at z=u. After propagating through L meters along the z direction, the field is collected by the entrance pupil of the receiver 120, i.e., {$\rho_L$:|$\rho_L$|≤$r_R$}.

Pulse broadening in time due to dispersion can be negligible in this quantum model and therefore is ignored. The maximum number of orthogonal temporal modes that can be packed within the probing interval T can be written as $M_T$=WT. Using the Yuen-Shapiro quantum diffraction theory, the field at the receiver $\hat{E}_L$ ($\rho_L$,t) can be connected to the field at the transmitter $\hat{E}_0$($\rho_0$,t) via the Huygens-Fresnel diffraction integral, i.e., $$\hat{E}_L(\rho_L, t) = \int d^2\rho_0 \hat{E}\left(\rho_0, t - \frac{L}{c}\right) h(\rho_0 - \rho_L).$$

Here, h(ρ)=exp [ikL+ik|ρ|²/2L]/(iλL) is a linear space-varying impulse response, which allows a normal-mode decomposition, i.e., h($\rho_0$−$\rho_L$)=$\Sigma_n \sqrt{\eta_n} \phi_n(\rho_L)\phi_n(\rho_0)$, where k=2π/λ, is the wave number and {$\eta_n$} are arranged such that 0<$\eta_0 \eta_1$ ... <1. {$\phi_n$ ($\rho_0$)} and {$\phi_n$($\rho_L$)} are the normal modes, complete orthogonal sets of modes at the transmitter and the receiver planes, respectively. In the event that only the {$\phi_n$ ($\rho_0$)} mode is modulated at the transmitter aperture, then only the $\{\phi_n(\rho_L)\}$ mode can be excited at the receiver aperture but with amplitude attenuation $\{\eta_n\}$.

Physically, this decomposition implies that diffraction limited propagation of a general optical quantum field between two apertures can be regarded as a countably-infinite set of independent lossy bosonic channels: $\hat{a}_n^{(L)} = \sqrt{\eta_n}\hat{a}_n^{(0)} + \sqrt{1-\eta_n}\hat{e}_n$, where $\hat{a}_0 = (\hat{a}_0^{(0)}, \hat{a}_1^{(0)}, \ldots)$ and $\hat{a}_{(L)} = (\hat{a}_0^{(L)}, \hat{a}_1^{(L)}, \ldots)$ are the annihilation operators corresponding to the transmitter and receiver pupil normal modes, respectively. $\{\hat{e}_n\}$ are the annihilation operators of environment modes that are included to preserve commutator brackets. In the near-field regime, roughly a total of D modes can be essentially lossless, i.e., $\eta_n \sim 1$, for $0 \leq n < D$.

The quantum model includes a beam displacement $d = (d_x, d_y)$ or a rotation $\theta = |d|/L$, of the transmitted field. When the displacement is small compared to the size of the receiver's aperture, i.e., $|d|/r_R \ll 1$, the displacement can be expressed either in d or in $\theta$. Since the measurement is typically performed on the received field, the quantum model considers the equivalent situation in which the receiver's aperture is displaced by $-d$. It can be assumed that the receiver separates the vacuum-propagation normal modes $\{\phi_n(\rho_L)\}$ (since the receiver does not know d apriori), the multispatial-mode input-output relationship is no longer an array of independent beamsplitters.

The displacement d can induce modal cross talk, which can be expressed as a spatial-mode transformation, $\hat{a}_L \to U(d)\hat{a}_L U(d)^\dagger = S\hat{a}_L$. Therefore, the action of displacement can be expressed as a passive Gaussian unitary transformation. The coupling matrix S is given by the following overlap integrals between the original and the displaced receiver-pupil normal modes:

$$S_{mn}(d) = \int d^2\rho_L \Phi_m^*(\rho_L - d)\Phi_n(\rho_L) \quad (4)$$

Therefore, the action of the beam displacement on a general multi-spatial-mode quantum state is the unitary: $U(d) = [-\hat{a}_L^\dagger (\ln S(d)\hat{a}_L]$. The transformation is unitary since it is assumed that the transmitter only modulates the lossless modes. In the event that the transmitter modulates more than D modes, or just one spatial mode in the far field regime (D<1), the quantum model further takes into account the losses (i.e., $\eta_n$).

The quantum model includes several simplifications. First, the quantum model considers only a single-scalar-parameter estimation problem, by assuming that the direction of displacement (in the (x, y) plane) is known to the receiver a priori. Without loss of generality, the direction of the displacement can be along the x-axis, i.e., $d = (d_x, 0)$.

Second, in the regime of small displacement, i.e., $\tilde{d} = d_x/r_R \ll 1$, the quantum model keeps up to the leading order term in $\tilde{d}$ in the coupling matrix $S = I - \Gamma\tilde{d} + O(\tilde{d}^2)$, where, $$\Gamma_{mn} = r_R \int_{-\infty}^{\infty} dxdy \frac{\partial \Phi_m^*(x,y)}{\partial x} \Phi_n(x,y) \quad (5)$$

It is evident that $\Gamma$ is anti-Hermitian, i.e., $\Gamma_{mn} = -\Gamma^*_{nm}$.

The unitary in this limit is given by $U(d) = \exp(i\tilde{d}\hat{H})$, where $$\tilde{H} = i\hat{a}_L^\dagger \Gamma \hat{a}_L \quad (6)$$

The Fresnel number product D separates all normal modes roughly into two sets: lossless and lossy modes. In this 1D problem, fixing the mode index along the y direction to zero, the number of lossless spatial modes is roughly $M_S = D^{1/2}$. Therefore, only the first $M_S$ modes are modulated, since loss is known to be detrimental to quantum enhancements in metrology. The spatial mode cross talk can be "short-ranged" (e.g., nearest neighbor in the mode indices) for infinitesimal displacements. As long as all the modes with indices above $M_S - \kappa$ are discarded, the maximal coupling range can be defined as $\kappa = \min \{k: \Gamma_{m, m+\kappa+1} = 0\}$, and the leftover subset of modes stays lossless.

For circular hard apertures, the normal modes include the generalized prolate-spheroidal wavefunctions. To clearly illustrate the truncation procedure, it is assumed the apertures are Gaussian-attenuation aperture pupils whose normal modes are Hermite-Gaussian (HG) modes: $\Phi_n(x) = (2/r_R^2) \psi_n(\sqrt{2}x/r_R)$. Here, $\psi_n(x) = (2^n n! \sqrt{\pi})^{-1/2} e^{-x^2/2} H_n(x)$ is the Hermite polynomial. The phase factor is ignored because it does not contribute to $\Gamma$ and the unitary. For HG modes, $\kappa = 1$, i.e., only nearest-neighbor couplings exist, as can be seen by directly calculating the coupling matrix, $$\Gamma_{mn} = \sqrt{m}\delta_{m-1,n} - \sqrt{m+1}\delta_{m+1,n} \quad (7)$$

Therefore, the first $M_S - 1$ modes comprise a closed lossless subspace under the action of small beam displacements.

In summary, the quantum model described herein can be fully described by the unitary $U(d) = \exp(i\tilde{d}\hat{H})$, where $\hat{H} = i\Sigma_{n=1}^{M-1} \sqrt{n}[\hat{a}_n^\dagger \hat{a}_{n-1} - \hat{a}_{n-1}^\dagger \hat{a}_n]$ by using Equation (7). Hereafter the mode operators at the transmitter and those at receiver are not differentiated because they are the same for the first $M_S$ modes.

Using the Jordan-Schwinger map, $\hat{J}_x^n = \frac{1}{2}(\hat{a}_{n-1}^\dagger \hat{a}_n + \hat{a}_n^\dagger \hat{a}_{n-1})$, $\hat{J}_y^n = i/2 (\hat{a}_n^\dagger \hat{a}_{n-1} - \hat{a}_{n-1}^\dagger \hat{a}_n)$, $\hat{J}_z^n = \frac{1}{2} (\hat{a}_{n-1}^\dagger \hat{a}_{n-1} - \hat{a}_n^\dagger \hat{a}_n)$, the Hamiltonian can be compactly written as follows:

$$\hat{H} = \Sigma_{n=1}^{M_S-1} 2\sqrt{n}\hat{J}_y^n \quad (8)$$

Each term in the sum in Equation (8) can represent a MZI with phase $2\sqrt{n}\tilde{d}$. Therefore, in the regime where $\tilde{d} \ll 1$, the unitary operator $U(\tilde{d})$ that captures the effect of a small beam displacement factorizes into a form where each mode interacts with its two neighboring modes with a two-mode MZI (see, e.g., FIG. 2 below). The performance of a sensor for measuring the displacement d can be quantified using the quantum Cramer-Rao bound, which is given by the inverse of Quantum Fisher Information (QFI). Given $\upsilon$ copies of the state $\rho_d$ (which encodes parameter d), the quantum Cramer-Rao bound gives a lower bound on the variance of an unbiased estimator constructed from joint quantum measurement at the output, i.e., $$\delta d^2 \geq \frac{1}{\upsilon \mathcal{F}_Q(\rho_d)} \quad (9)$$

The quantum Cramer-Rao bound is a tighter lower bound compared with that given by the classical Cramer-Rao bound of the outcome of any specific quantum measurement on $\rho_d$. For a unitary of the form $U(d) = \exp(i\tilde{d}\hat{H})$, $\tilde{d} = d/r_R$, and a pure input state probe, resulting in an output $\rho_d$, the QFI can be independent of d and expressed as a constant times the variance $\Delta^2 \hat{H} = \langle \hat{H}^2 \rangle - \langle \hat{H} \rangle^2$ of the Hamiltonian $\hat{H}$, i.e., $$\mathcal{F}_Q = (4/r_R^2)\Delta^2 \hat{H}.$$

Figures 2A, 2B, 2C:
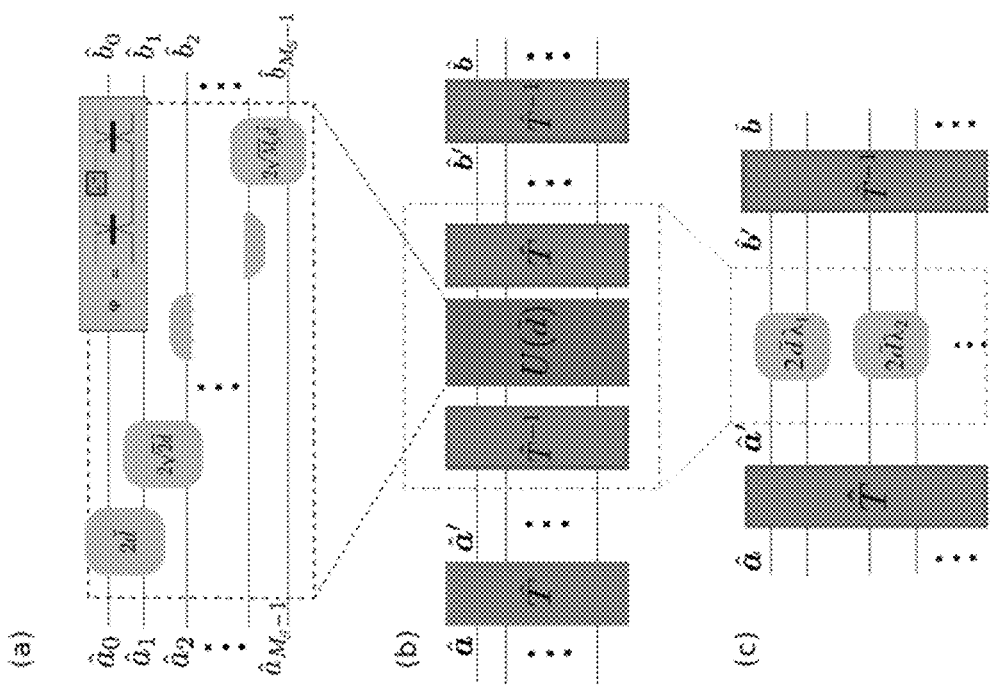
FIGS. 2A-2C illustrate a quantum model of lateral displacement in an optical beam having spatio-temporal entanglement, according to an embodiment.

FIGS. 2A-2C illustrate a quantum model of lateral displacement d in an optical beam having spatio-temporal entanglement, according to an embodiment. In the limit of $\tilde{d} = d/r_R \ll 1$, where $r_R$ is the radius of the receiver aperture, and within the near field regime (D>>1), the effect of beam displacement can be treated as a series of pairwise nested Mach-Zehnder interferometer (MZI) interactions on spatial modes n and n−1, n=1, 2, ..., $M_S$−1. The n-th MZI includes a phase shift of $2\sqrt{n}\tilde{d}$ sandwiched by two 50-50 beamsplitters (see, e.g., inset of FIG. 2A). By inserting a properly chosen mode transformation $\hat{T}$ and its inverse $\hat{T}^{-1}$ on either side of $U(\tilde{d})$, the effective beam displacement unitary $\hat{T}^{-1}U(\tilde{d})\hat{T}$ in the transformed mode basis is a set of $M_S/2$ pairwise two-mode MZIs, as shown in FIGS. 2B and 2C. The phase of each MZI is given by the eigenvalues of the coupling matrix T described above multiplied by $\tilde{d}$.

To verify the quantum model and also to illustrate the performance improvement introduced by spatial and/or temporal entanglement in the probe beam, the minimum estimation error for a general single-spatial-mode probe state (classical or quantum) is calculated. In this instance, the jth spatial mode of the probe beam is excited in some state $|\psi\rangle$ with mean photon number $N_S$, $j \in [0, M_S-2]$, while leaving the other spatial modes in vacuum.

The calculation of the variance of the Hamiltonian $\hat{H}$ can be straightforward. The mean value vanishes due to the skew-symmetry of the coupling matrix $\Gamma$, i.e., $\Gamma^T = -\Gamma$. $\langle\hat{H}\rangle = i\langle\Gamma_{00}\hat{a}_0^\dagger\hat{a}_0\rangle = 0$. For the mean square of $\hat{H}$, only the coupling term between the j and j+1 modes contributes. Therefore, $\Delta^2\hat{H} = N_S\Gamma_{j,j+1}^2 = jN_S$, which gives $\mathcal{F}_Q = 4jN_S/r_R^2$. The minimum error that can be achieved by a single-mode state is $\delta d = r_R/2\sqrt{jN_S}$. Therefore, for a single-spatial-mode probe, using a higher-order spatial mode (i.e., higher mode index j) can achieve higher sensitivity, but the sensitivity is still constrained by the SQL, i.e., the $1/(N_S)^{1/2}$ scaling.

Without being bound by any particular theory or mode of operation, achieving higher sensitivity using a higher-order mode can be understood by noticing that a higher-order Hermite Gaussian (HG) mode oscillates (in space) more rapidly, thereby making it more sensitive to a small transverse spatial shift of the beam. This observation also shows up as the $j^{1/2}$ pre-factor in the effective MZI phase accrued in the interference between modes j−1 and j, as illustrated in FIG. 2A. In other words, physically, probing with a high-order spatial mode once can be equivalent to probing with a lower-order mode multiple times because the same beam displacement can cause the higher-order mode to be modulated by a larger phase. This method can be extended to any other choice of aperture function (and its associated normal modes) other than the circular aperture as used in this analysis.

Based on the above analysis, the performance of a classical probe beam can be estimated. The most general $M_S$−1 mode classical state is a mixture of product of coherent states $\int d\alpha P(\alpha)|\alpha\rangle\langle\alpha|$, where $\alpha = (\alpha_0, \alpha_{M_S-2})$ and $P(\alpha)$ is arbitrary probability distribution. As previously mentioned, it is sufficient to consider a pure input state due to the convexity of the QFI. So, considering a coherent state $|\alpha\rangle$ suffices. The next useful observation is that a coherent state typically is a single (spatio-temporal) mode in an appropriate mode basis.

Invoking the above result for the general single-mode quantum state, the optimal precision is obtained by putting the coherent state in the highest-order normal mode, i.e.:

$$\delta d^P \cong \frac{r_R}{2\sqrt{M_S N_S}} = \frac{r_R}{2M_S\sqrt{\bar{n}}} \quad (10)$$

where $\bar{n} = N_S/M_S$ is the is the mean photon number per mode (ignoring the difference between $M_S$ and $M_S$−1).

The generalization of the above result to spatio-temporal modes can be achieved by considering a product of $M_T$ single-spatial-mode states with precision given in Equation (10), given the QFI is additive, the result is:

$$\delta d^P \cong \frac{r_R}{2\sqrt{M_S M_T N_S}} = \frac{r_R}{2M_S\sqrt{M_T\bar{n}}} \quad (11)$$

Equation. (11) can also be derived from (10) by replacing $\bar{n}$ with $M_T\bar{n}$. The rationale is that a coherent state is typically a single mode, i.e., the optimal probe can be regarded as a single spatio-temporal mode coherent state with $M_T\bar{n}$ mean photons in the highest-order normal mode.

The Hamiltonian in Equation (8), which describes a set of coupled MZIs, can be transformed into one of a set of independent MZIs (see, e.g., Equation (14) below) after a suitable unitary mode-transformation. The problem of finding the optimal multi-mode probe state thereby reduces to finding the optimal probe in a new mode basis, where each mode pair accrues an independent phase (see FIG. 2). The analysis here can start by focusing on spatial modes, i.e., fixing a particular temporal mode index, and then generalizing the finding to the case of using full spatio-temporal modes.

As shown in the quantum model illustrated in FIG. 2B, two pairs of unitaries $\{\hat{T}, \hat{T}^\dagger\}$ are inserted into the model without changing the dynamics, i.e., $$\hat{a}' = \hat{T}\hat{a}\hat{T}^\dagger \quad (12)$$

where T is the transformation matrix on the annihilation operators induced by the unitary $\hat{T}$.

For a skew-symmetric matrix $\Gamma$ (i.e., $\Gamma^T = -\Gamma$), an orthogonal transformation T exists such that:

$$T\Gamma T^T = \bigoplus_{k=1}^{\lceil M_S/2\rceil} i\sigma_y \lambda_k \quad (13)$$

where $$\sigma_y = \begin{pmatrix} 0 & -i \\ i & 0 \end{pmatrix}$$

is the Pauli Y operator, and $\{\pm i\lambda_k\}$ are the eigenvalues of the coupling matrix $\Gamma$. In general, finding $\{\lambda_k\}$ involves solving the roots of the characteristic equation of $\Gamma$, for which no analytical formula might exist.

The unitary $\hat{T}$ can be configured such that that $\Gamma$ is brought into the normal form described above. The fact that T is orthogonal implies that $\hat{T}$ is a passive Gaussian unitary, and hence realizable by a mode transformation. To re-express the Hamiltonian of Equation (6) in the new basis â', Equation (12) is applied and $\hat{H} = i\hat{a}'^\dagger (T\Gamma T^T)\hat{a}'$. Invoking the transformation in Equation (13) yields:

$$\hat{H} = 2\Sigma_{k=1}^{\lceil M_S-2\rceil} \lambda_k \hat{S}_y^{2k-1} \quad (14)$$

where $$\hat{S}_y^{2k-1} = \frac{i}{2}(\hat{a}'^\dagger_{2k-1}\hat{a}'_{2k-2} - \hat{a}'^\dagger_{2k-2}\hat{a}'_{2k-1}).$$

Since each term in the above sum describes an MZI with phase $2\tilde{d}\lambda_k$, the action of beam displacement is re-expressed, i.e., originally expressed in Equation (8) as a nearest-neighbor-mode coupled unitary on the $\hat{a}$ modes, now expressed as a pairwise-mode coupled unitary where pairs of $\hat{a}'$ modes accrue independent MZI phases (See also FIG. 2C) as described by Equation (14). For convenience, $N_k$ is defined as the average photon number put into the kth subsystem, i.e., in modes 2k−1 and 2k−2.

To construct the Ms-mode (entangled) state that can maximize the QFI, $\mathcal{F}_Q = (4/r_R^2)\Delta^2\hat{H}'$, the analysis here first considers an upper bound $\Delta\hat{H}' \leq \Sigma_k(s_{max}^k - s_{min}^k)/2$ where $s_{max}^k(s_{min}^k)$ is the maximum (minimum) eigenvalue of the kth two-mode subsystem described by Hamiltonian $2\lambda_k \hat{S}_y^{2k-1}$. From the Schwinger representation, each subsystem with Hamiltonian $2\lambda_k \hat{S}_y^{2k-1}$ is equivalent to a spin-$N_k/2$ system, therefore $s_{max}^k = \lambda_k N_k$ and $s_{min}^k = -\lambda_k N_k$. Summing them together provides: $\Delta^2\hat{H}' \leq (\Sigma_k \lambda_k N_k)^2$.

The optimal probe that saturates this upper bound can be given by the following entangled state in the a' basis:

$$|\Psi^E\rangle_{a'} = \frac{1}{\sqrt{2}}(|+\rangle_{a'} + |-\rangle_{a'}), \text{ with} \quad (15)$$

$$|+\rangle_{a'} = \bigoplus_{k=1}^{\lceil M_S/2 \rceil} \hat{R}_x^{2k-1}\left(\frac{\pi}{2}\right) |N_k, 0\rangle_{a'_{2k-1} - a'_{2k}}, \quad (16)$$

$$|-\rangle_{a'} = \bigoplus_{k=1}^{\lceil M_E/2 \rceil} \hat{R}_x^{2k-1}\left(\frac{\pi}{2}\right) |0, N_k\rangle_{a'_{2k-1} - a'_{2k}}. \quad (17)$$

The states $|\pm\rangle_{a'}$ correspond to putting all the spins into up (resp., down) along the y direction. The optimal probe in the original $\hat{a}$ mode basis can be readily obtained by applying the $M_S$-mode linear transformation $T^\dagger$ on $|\Psi^E\rangle_{a'}$.

For a given photon-number distribution across spatial modes $\{N_k\}$, the optimal QFI achieved by this entangled probe is given by $4(\Sigma_k \lambda_k N_k)^2/r_R^2$. The QFI can be further optimized over all possible photon number distributions. Define ratio $c_k = N_k/N_S$ such that $\Sigma_{k=1}^{M_S/2} c_k = 1$. The QFI given by $4(\Sigma_k \lambda_k N_k)^2/r_R^2 = 4N_S^2(\Sigma_k \lambda_k c_k)^2/r_R^2$ is maximized by choosing $c_k = \lambda_k/\Sigma_k \lambda_k$. According, the optimal QFI achieved by this choice of photon distribution is given by:

$$\mathcal{F}_Q^E = \frac{4N_S^2}{r_R^2}\left(\frac{\sum_k \lambda_k^2}{\sum_k \lambda_k}\right)^2 \quad (18)$$

To study the asymptotical behavior of the QFI, consider that $\Sigma_k \lambda_k^p = \frac{1}{2}\|\Gamma\|_p^p$, where $\|\Gamma\|_p^p$ is the Schatten p-norm of $\Gamma$. In the limit of $M_S \gg 1$, $\|\Gamma\|_2 \cong M_S$ and $\|\Gamma\|_1 \cong M_S^{3/2}$. Therefore, following minimum estimation error can be achieved:

$$\delta d^E \cong \frac{r_R}{\sqrt{M_S N_S}} \quad (19)$$

This sub-Heisenberg scaling behavior in Equation (19) can be attributed to a composite effect of the spatial entanglement of the probe and the phase gradient in the Hamiltonian in Equation (14), i.e., increasing $\lambda_k$ values in the effective MZI array in FIG. 2C. The former contributes to the HL scaling while the latter leads to another $M_S^{1/2}$ enhancement in the sensitivity.

The results above can be generalized to include the use of all temporal modes available. If no entanglement exists across the temporal mode index, i.e., consider a product state over the $M_T$ orthogonal temporal modes, the following precision for this hybrid probe (entangled in space but not over time) can be achieved:

$$\delta d^H \cong \frac{d_R}{\sqrt{M_T} M_S^{3/2} \bar{n}} \quad (20)$$

from the additivity of the QFI.

On the other hand, the optimal spatio-temporal probe state is an entangled state across both the spatial and the temporal indexes. For $M_T$ temporal-modes, effectively the original coupling matrix has $M_T$ copies. Therefore, redefining $c_k = \lambda_k / \Sigma_{k=1}^{M_S M_T/2} \lambda_k$ can achieve an optimal QFI with the same form as in Equation (18), with $N_S$ replaced by N. The terms inside of the bracket in Equation (18) stay the same due to the periodicity of $\{\lambda_k\}$. Therefore, the precision that can be obtained by using a probe entangled across all the spatio-temporal modes is given by:

$$\delta d^E \cong \frac{r_R}{\sqrt{M_S} N} = \frac{r_R}{M_T M_S^{3/2} \bar{n}} \quad (21)$$

The analysis above can be used for constructing quantum beam tracking systems for specific applications. For example, a quantum beam tracking system can include a transceiver design that involves a Gaussian (e.g., multi spatio-temporally-entangled squeezed-state) probe and a Gaussian measurement (e.g., homodyne-like), which can attain the quantum-optimal scaling with respect to $M_T$, $M_S$ and $\bar{n}$, as shown in Equation (21).

Figure 3:
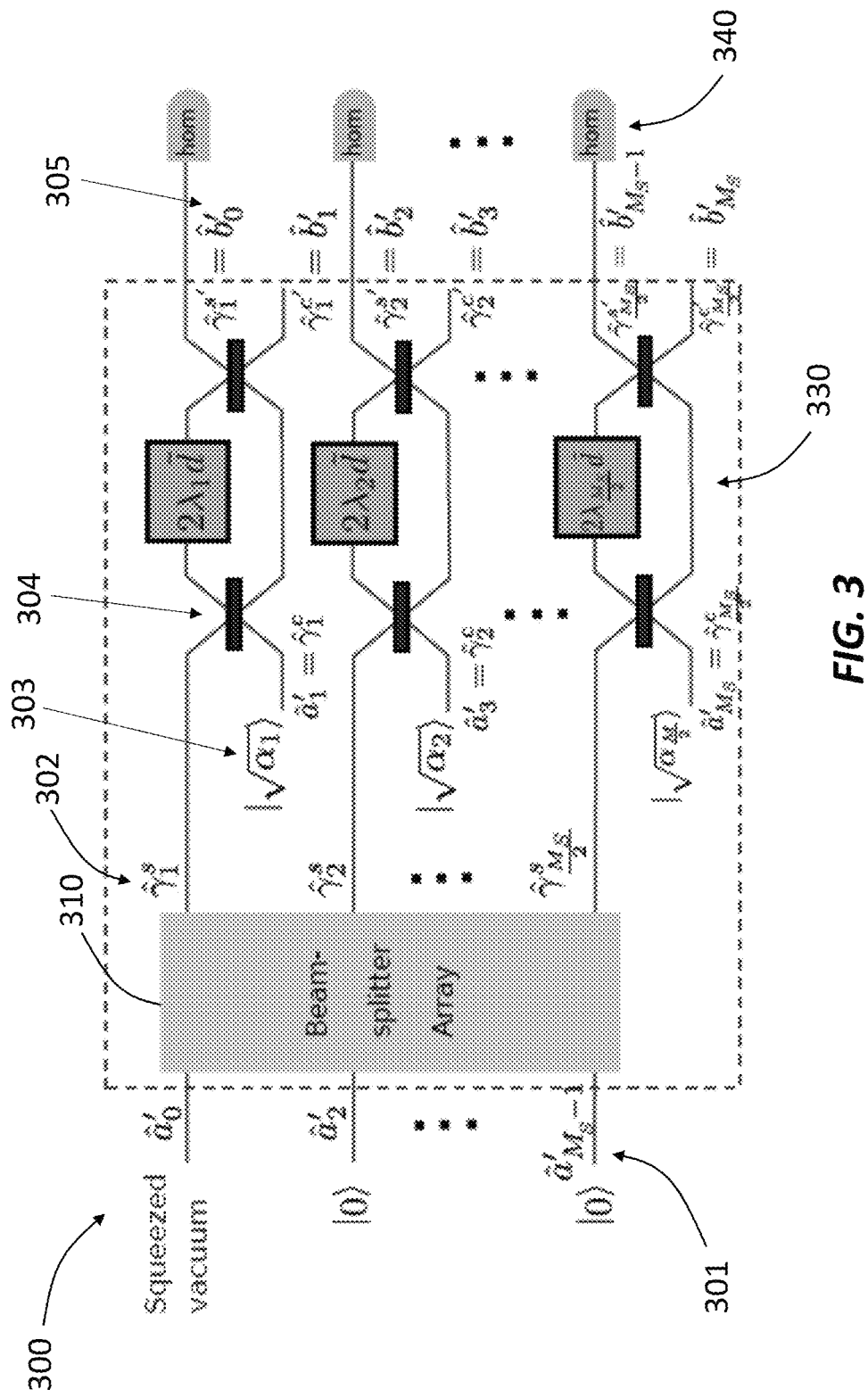
FIG. 3 shows a schematic of a system for quantum beam tracking using displaced squeezed light including entangled spatial modes, according to an embodiment.

FIG. 3 shows a schematic of a system 300 for quantum beam tracking using displaced squeezed light having spatial entanglement, according to an embodiment. In the system 300, an input optical beam 301 including $M_s$ modes in a squeezed vacuum state is sent to a beamsplitter array 310 so as to generate an entangled optical beam 302 having $M_s$ orthogonal spatial modes that are entangled with each other. Each orthogonal spatial mode in the entangled optical beam 302 is combined with a displacement mode from a displacement beam 303 to generate a probe beam 304, which is sent to an MZI array 330. The light source that provides the input optical beam 301 (not shown in FIG. 3), the beamsplitter array 310, and the combiner where the beams 302 and 303 are combined can form a transmitter (e.g., the transmitter 110 in the system 100 shown in FIG. 1A). One arm in each MZI from the MZI array 330 introduces a displacement (denoted as $\lambda_k \tilde{d}$) into the probe beam 304. The output probe beam 305 after the MZI array 330 is measured by a receiver 340 (e.g., via homodyne detection). A processor (not shown in FIG. 3) can be used to process the signals measured by the receiver 340 and calculate the displacement $\tilde{d}$. The processor can be substantially identical to the processor 130 in the system 100 described above.

The $M_S/2$ MZIs in the MZI array 330 are substantially identical to the MZIs in the quantum model illustrated in FIG. 2C, and the state input into the MZI array 330 are of the $\hat{a}'$ modes. The actual probe (the $\hat{a}$ modes) is related to the $\hat{a}'$ modes by a mode transformation $\hat{T}$. The beam displacement d̃ gets encoded as a quadrature displacement of the probe light 304. The receiver 340 includes an array of homodyne receivers on the b̂' modes (see, e.g., FIG. 2B). Since the target-modulated state, the b̂ modes, is a mode transformation $\hat{T}^{-1}$ away from the b̂' modes, the actual sensor receiver can include an appropriately mode-resolved homodyne array.

The optical mode pairs that interrogate the $M_S/2$ decoupled effective MZIs in the MZI array 330 are $\hat{\gamma}=\{\hat{\gamma}^s, \hat{\gamma}^c\}$. The mean transmit photon number across all spatial modes, $N_S$, is distributed equally between the $\hat{\gamma}^s$ modes (in the entangled optical beam 302) and $\hat{\gamma}^c$ modes (in the displacement beam 303), i.e., $N_s=N_c=N_S/2$. The modes $\hat{\gamma}^s=(\hat{\gamma}_1^s, \ldots, \hat{\gamma}_{M_S/2}^s)$ are a result of a linear mode transformation applied by the beamsplitter array 310 on the even â' modes. The modes $$\hat{\gamma}^c \equiv (\hat{\gamma}_1^c, \ldots, \hat{\gamma}_{\frac{M_S}{2}}^c)$$

can be excited in coherent states $|\sqrt{\alpha_k}\rangle$, $k=1, \ldots, M_S/2$ with mean photon number commensurate with the phase gradient in the effective MZI array, i.e., $|\alpha_k|^2=c_k N_c$, $c_k=\lambda_k/\Sigma_k \lambda_k$.

In near-field applications where the number of lossless spatial modes $N_S$ is large, and the beam displacement to be measured is small, $\lambda_k \tilde{d} \ll 1$. In this regime, the modes in the output beam 305 from the MZI array 330 can be approximated as $\hat{\gamma}_k^{s'} \cong (1-i\lambda_k \tilde{d})\hat{\gamma}_k^s + i\lambda_k \tilde{d}\hat{\gamma}_k^c$. The beam displacement d̃ gets encoded into mean fields (i.e., quadrature displacements) of the originally-zero-mean $\hat{\gamma}_k^s$ modes. In other words, $\langle \hat{\gamma}_k^{s'} \rangle = \lambda_k \langle \hat{\gamma}_k^c \rangle \tilde{d} = \lambda_k \sqrt{c_k N_c} \tilde{d}$.

Consider the following estimator of d̃:

$$\tilde{d} = \frac{\sqrt{2}}{A\sqrt{N_S}} \sum_{k=1}^{\lceil M_S/2 \rceil} \sqrt{c_k}\, \mathrm{Im}(\hat{\gamma}_k^{s'}) \quad (22)$$

where $A=\Sigma_k \lambda_k^2/\Sigma_k \lambda_k$. The estimator constructed above is unbiased, in the sense that $\langle \tilde{d} \rangle = \tilde{d}$.

The beamsplitter array 310 in the system 300 can be configured as a unitary such that $\hat{a}'_0 = \Sigma_k \sqrt{c_k}\hat{\gamma}_k^s$, which preserves the canonical relation $[\hat{a}'_0, \hat{a}'_0{}^\dagger]=1$. This configuration gives $$\tilde{d} = \frac{\sqrt{2}}{A\sqrt{N}}\, \mathrm{Im}(\hat{b}'_0).$$

The estimation error can be minimized when the $\hat{a}'_0$ mode is in its squeezed-vacuum state with an average photon number $N_S$ whose real quadrature is squeezed, i.e.:

$$\delta \tilde{d}^G = \frac{\sqrt{2}}{A\sqrt{N_S}} \frac{1}{\sqrt{N_S+1}+\sqrt{N_S}} \quad (23)$$

Taking the large $N_S$ limit, and using the facts $N_s=Ns/2$, $A \sim (M_S)^{1/2}$, and $\tilde{d}=d/r_R$, the Gaussian state constructed above achieves the same estimation error scaling as in Equation (21). Notice that in the event that $N_s=0$ in Equation (23), the input state becomes a classical input state, and the estimation error scaling is consistent with previous result for the optimal classical probe in Equation (11).

The procedure to generalize the above spatially-entangled Gaussian transceiver construction to entangled spatiotemporal modes is as follows. The block-diagonalized unitary is given by repeating the MZI-array 330 shown in FIG. 3 for $M_T$ times. The energy distributions for the coherent states stay the same for each temporal mode index, i.e., $c_k=\lambda_k/\Sigma_{k=1}^{M_S M_T/2}\lambda_k$. Therefore, the estimator in Equation (22) remains the same, with the upper limit of summation being extended from $M_S/2$ to $M_T M_S/2$ and $N_S$ being replaced by N. Similarly as in non-Gaussian optimal states, A is invariant under this extension because the eigenvalues $\{\lambda_k\}$ are periodic. In addition, a $M_T M_S/2$ mode beamsplitter array is employed such that $\hat{a}'_0 = \Sigma_k \sqrt{c_k}\hat{\gamma}_k^c$ so as to entangle across all spatial-temporal modes. Putting a squeezed vacuum in mode $\hat{a}'_0$ with average photon number $N_S=N/2$, the same minimum estimation error as in Equation (21) can be achieved.

Figure 4:
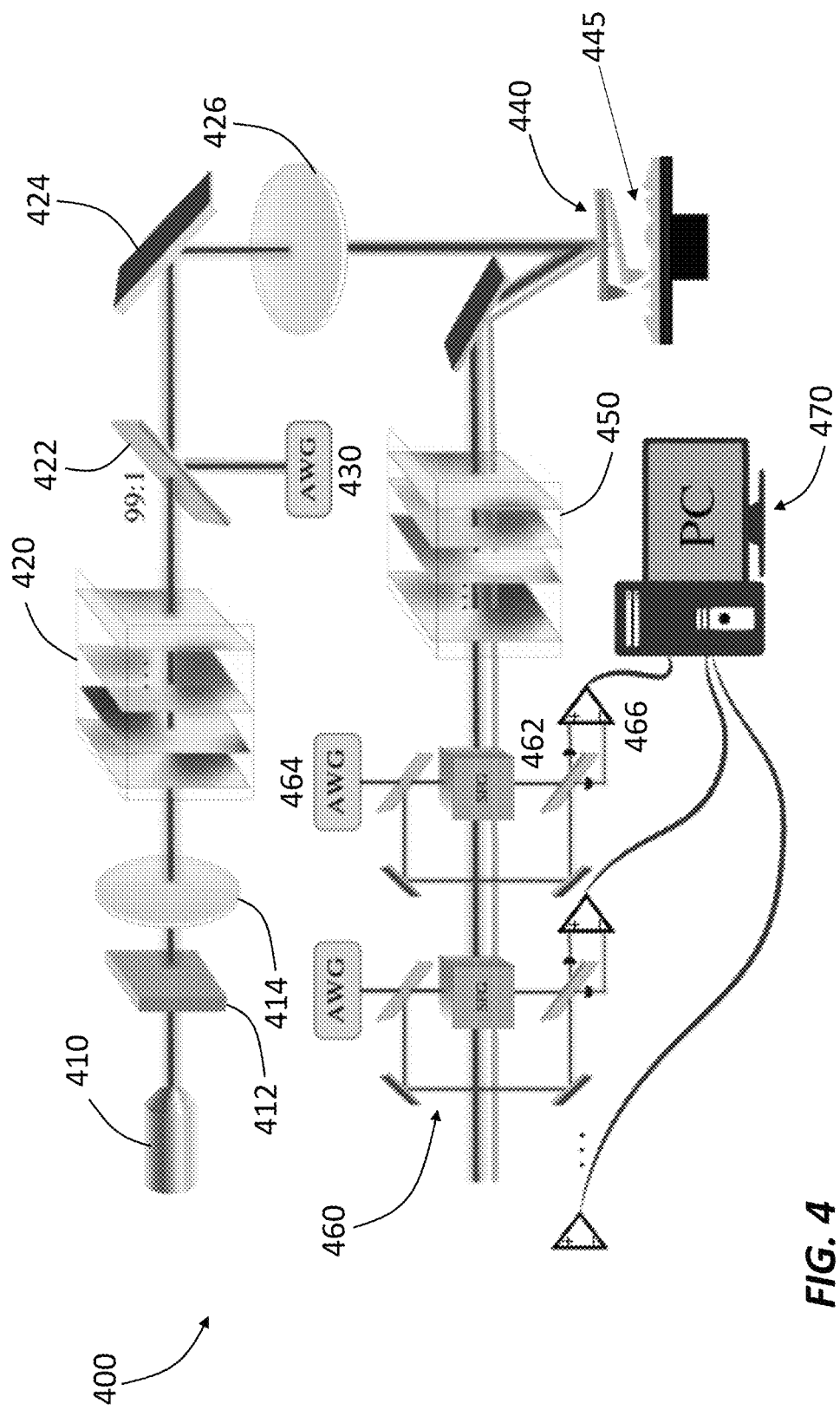
FIG. 4 shows a schematic of a system for measuring the motion of a cantilever in an atomic force microscope (AFM) using quantum beam tracking, according to an embodiment.

FIG. 4 shows a schematic of a system 400 for measuring the motion of a cantilever in an atomic force microscope (AFM) using quantum beam tracking, according to an embodiment. The system 400 includes a light source 410 (e.g., a laser) to send an optical beam into an optical parametric amplifier (OPA) 412 that uses a non-linear crystal pumped by a continuous-wave laser. The OPA 412 is configured to produce a multispatial-mode squeezed light. The output of the OPA 412 is sent to a universal volumetric mode sorter 420 (e.g., via a lens 414) to undergo a multi-spatial-mode transformation. In some embodiments, the universal mode sorter 420 includes a stack of phase spatial-light modulators (SLMs) separated by small Fresnel propagation segments through an isotropic medium. In some embodiments, the universal volumetric mode sorter 420 can include a sequence of deformable mirrors to realize arbitrary multi-spatial-mode transformations. This transformation implemented by the device 420 combines the effects of beamsplitter array 310 shown in FIG. 3 and the unitary $\hat{T}^\dagger$.

A multi-mode displacement is then introduced into the output of the device 420 (now an entangled optical beam) at a combiner 422 (e.g., a 99:1 splitter) to generate a displaced squeezed light beam including orthogonal spatial modes that are entangled with each other. The displacement beam can be provided by an arbitrary waveform generator (AWG) 430. In some embodiments, the light source 410, the OPA 412, the universal volumetric mode sorter 420, and the combiner 422 form a transmitter (e.g., the transmitter 110 in FIG. 1A).

The light beam after the combiner 422 is employed as the probe beam to measure the motion of a cantilever 440 in an AFM (e.g., during probing of biological samples). The probe beam can be sent to the cantilever 440 via a reflector 424 and a lens 426. The probe beam reflected by the back of the cantilever 440 is sent to a device 450 including stack of SLMs separated by Fresnel propagation segments of an isotropic medium. The device 450 is configured to apply the multimode unitary $\hat{T}$ (see, e.g., FIGS. 2B-2C). A sequence of mode-selective up-converters 460 is then employed to selectively extract each mode in the probe beam for homodyne detection of the phase of each extracted mode (e.g., using a homydyne detector 466). Two up-converters 460 are shown for illustrative purposes only. In practice, the system 400 can include any other number of up-converters (e.g., based on the number of modes in the probe beam).

In some embodiments, each mode-selective up-converter in the sequence of mode-selective up-converters 460 can be implemented via sum-frequency generation (SFG) (e.g., 462) pumped by an LO (e.g., an AWG 464) in the desired mode. The classical outcome of the homodyne detector array is processed by a computer 470 to estimate the beam displacement, which maps to a small longitudinal displacement of the cantilever 440. This procedure can be repeated while the probe beam is raster scanned on a sample 445, to map out the surface structure of the sample 445.

Figure 5:
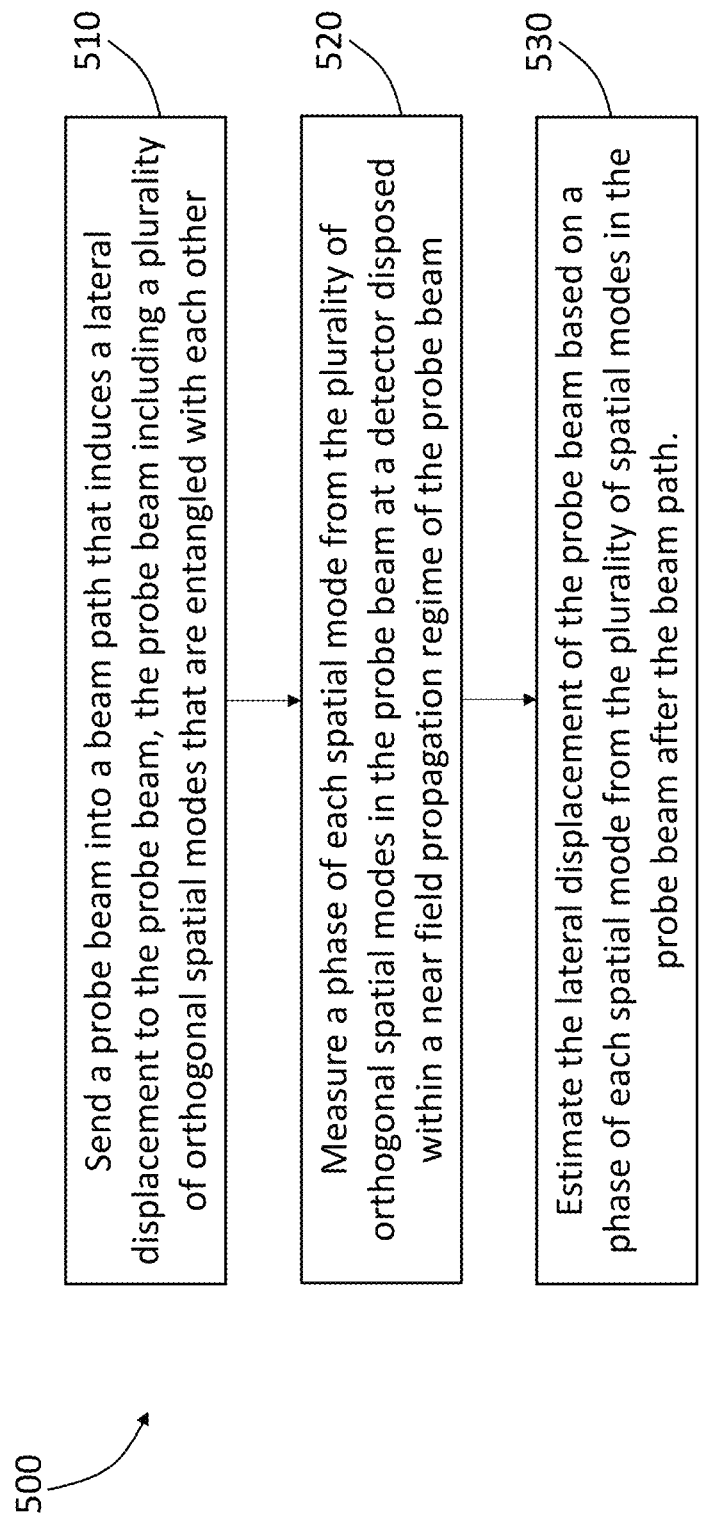
FIG. 5 is a flowchart illustrating a method of quantum beam tracking, according to an embodiment.

FIG. 5 is a flowchart illustrating a method 500 of quantum beam tracking, according to an embodiment. The method 500 includes, at 510, sending a probe beam into a beam path that induces a lateral displacement to the probe beam. The probe beam includes a plurality of orthogonal spatial modes that are entangled with each other. The method 500 also includes, at 520, measuring the phase of each spatial mode from the plurality of orthogonal spatial modes in the probe beam at a detector disposed within a near field propagation regime of the probe beam. In some embodiments, the phase of each mode in the probe beam can be measured via homodyne detection. The method 500 also includes estimating the lateral displacement of the probe beam based on the phase of each spatial mode from the plurality of spatial modes in the probe beam after the beam path.

In some embodiments, the probe beam includes displaced squeezed light. In some embodiments, the probe beam also includes a plurality of orthogonal temporal modes that are entangled with each other. In some embodiments, the probe beam includes a plurality of orthogonal spatial modes and a plurality of orthogonal temporal modes. Each mode (spatial or temporal) is entangled with another mode (spatial or temporal) in the probe beam.

In some embodiments, a transmitter having a first pupil area $A_t$ is used to send the probe beam, and a receiver having a second pupil area $A_r$ is used to measure the phase of each spatial mode in the probe beam within the near field propagation regime of the probe beam. In some embodiments, the parameter D, defined as $A_t A_r/(\lambda L)^2$, can be no less than 5 (e.g., about 5, about 10, about 15, or greater), where $\lambda$ is a central wavelength of the probe beam and L is a length of the beam path.

In some embodiments, the estimation of the lateral displacement of the probe beam can be performed with a standard deviation substantially equal to $W/\sqrt{M_s} \times 1/P\sqrt{T}$, where W is the bandwidth of the probe beam, $M_s$ is the number of orthogonal spatial modes in the probe beam, P is a power of the probe beam, and T is a time duration of the probe beam. In some embodiments, the probe beam also includes orthogonal temporal modes that are entangled with each other (and entangled with the spatial modes). In these embodiments, the estimation of the lateral displacement of the probe beam can be performed with a standard deviation substantially equal to $1/\sqrt{M_s} \times 1/PT$.

Systems, apparatus, and methods described herein for quantum beam tracking can be used to detect a small lateral movement of an optical beam at high precision (e.g., having a sub-Heisenberg-limit scaling over the number of spatial modes). The quantum beam tracking technology can use a multi-mode Gaussian probe and receiver construct that achieves the quantum optimal precision as described herein. The production, transformation, and detection of Gaussian quantum states (i.e., multi-mode squeezed states) are usually less complicated compared to those of non-Gaussian states. Therefore, this quantum beam tracking technology can be far more feasible to implement in practice.

The quantum beam tracking technology can benefit various applications. In some embodiments, the quantum beam tracking technology can be used in biological applications, where it is usually desirable to acquire high quality images of samples while the cellular processes being investigated are in their in vivo state. A high-power optical beam may disrupt the cellular processes, thereby imposing a limit of the beam power that can be used in imaging the sample, which in turn usually compromises the quality of the resulting images. The quantum beam tracking technology can address this conflict because this technology can operate at a desired accuracy with far less illumination power compared with a classical probe.

In some embodiments, the quantum beam tracking technology can be used in covert sensing, where one goal of the sensor is to prevent the detection of the optical probing attempt by an adversary (e.g., by hiding the probe signal within the thermal noise floor). This application can also benefit from the lower probe power used in the quantum beam tracking.

The analysis described herein ignored losses during propagation, light generation, and/or light detection of the probe beam (i.e., only lossless modes are considered). Even though diffraction limited propagation loss is essentially negligible in the nearfield regime, loss contribution from scattering and absorption in propagation, as well as losses within the source and receiver (e.g., from sub-unity-efficiency detection and mode transformation losses) can still arise. In some applications involving ultrasensitive beam displacement estimation, such as pointing and acquisition for a far-field lasercom link, diffraction-limited loss can be taken into account. In some embodiments, the effect of such loss can be alleviated by increasing the number of modes while keeping the total average photon number fixed.

In some embodiments, the quantum tracking technology can be extended to sensing both transverse and longitudinal movement of an optical beam, with applications to vibrometry, Doppler ranging, and 3D imaging. In these instances, the optimal probe could achieve sub-Heisenberg limit scaling over both the number of spatial modes and the number of temporal modes.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   sending a probe beam into a beam path that induces a lateral displacement to the probe beam, the probe beam including a plurality of orthogonal spatial modes that are entangled with each other;
   measuring a phase of each spatial mode from the plurality of orthogonal spatial modes in the probe beam at a detector disposed within a near field propagation regime of the probe beam; and
   estimating the lateral displacement of the probe beam based on the phase of each spatial mode from the plurality of spatial modes in the probe beam after the beam path.

2. The method of claim 1, wherein the probe beam includes displaced squeezed light.

3. The method of claim 1, wherein the beam path includes an interferometer having a first arm to propagate a first portion of the probe beam and a second arm to propagate a second portion of the probe beam, the first arm being configured to induce the lateral displacement to the probe beam.

4. The method of claim 1, wherein:
   sending the probe beam includes sending the probe beam from a transmitter having a first pupil area $A_t$,
   measuring the phase of each spatial mode from the plurality of orthogonal spatial modes includes measuring the phase of that spatial mode using the detector having a second pupil area $A_r$, and
   $A_t A_r/(\lambda L)^2$ is not less than 5, where $\lambda$ is a central wavelength of the probe beam and L is a length of the beam path.

5. The method of claim 1, wherein:
   sending the probe beam into the beam path includes sending the probe beam towards a cantilever of an atomic force microscope (AFM), the cantilever configured to reflect the probe beam towards the detector and induce the lateral displacement to the probe beam via motion of the cantilever, and the method further includes estimating the motion of the cantilever based on the lateral displacement of the probe beam.

6. The method of claim 1, wherein estimating the lateral displacement of the probe beam includes estimating the lateral displacement with a standard deviation substantially equal to $W/\sqrt{M_s} \times 1/P\sqrt{T}$, where W is a bandwidth of the probe beam, $M_s$ is a number of orthogonal spatial modes in the probe beam, P is a power of the probe beam, and T is a time duration of the probe beam.

7. The method of claim 1, wherein the probe beam further includes a plurality of orthogonal temporal modes that are entangled with each other.

8. The method of claim 1, wherein:
   the probe beam further includes a plurality of orthogonal temporal modes that are entangled with each other, and
   estimating the lateral displacement of the probe beam includes estimating the lateral displacement with a standard deviation substantially equal to $1/\sqrt{M_s} \times 1/PT$, where $M_s$ is a number of orthogonal spatial modes in the probe beam, P is a power of the probe beam, and T is time duration of the probe beam.

9. The method of claim 1, wherein measuring the phase of each orthogonal spatial mode includes:
    extracting each orthogonal spatial mode from the probe beam; and
    measuring the phase of each orthogonal mode via homodyne detection.

10. The method of claim 1, wherein measuring the phase of each orthogonal spatial mode includes:
    sending the probe beam through a sequence of mode-selective up-converters, each mode-selective up-converter from the sequence of mode-selective up-converters configured to extract a unique orthogonal spatial mode from the plurality of orthogonal spatial modes in the probe beam so as to measure the phase of that orthogonal spatial mode via homodyne detection.

11. The method of claim 1, further comprising:
    sending a squeezed light beam through a stack of spatial-light modulators (SLMs) separated by an isotropic medium to generate an entangled squeezed light beam; and
    mixing the entangled squeezed light beam with a displacement beam provided by an arbitrary waveform generator (AWG) so as to generate the probe beam.

12. A system, comprising:
    a transmitter configured to send a probe beam into a beam path that induces a lateral displacement to the probe beam, the probe beam including a plurality of orthogonal spatial modes that are entangled with each other;
    a receiver configured to be in optical communication with the transmitter and configured to measure a phase of each spatial mode from the plurality of orthogonal spatial modes in the probe beam, the receiver being disposed within a near field propagation regime of the probe beam; and
    a processor operatively coupled to the receiver configured to estimate the lateral displacement of the probe beam based on a phase of each spatial mode from the plurality of orthogonal spatial modes in the probe beam after the beam path.

13. The system of claim 12, wherein the probe beam includes displaced squeezed light.

14. The system of claim 12, wherein the beam path includes an interferometer having a first arm to propagate a first portion of the probe beam and a second arm to propagate a second portion of the probe beam, the first arm being configured to induce the lateral displacement to the probe beam.

15. The system of claim 12, wherein the transmitter has a first pupil area $A_t$, the receiver has a second pupil area $A_r$, and $A_t A_r/(\lambda L)^2$ is no less than 5, where $\lambda$ is a central wavelength of the probe beam and L is a length of the beam path.

16. The system of claim 12, wherein:
    the transmitter is configured to send the probe beam towards a cantilever of an atomic force microscope (AFM), the cantilever configured to reflect the probe beam towards the receiver and induce the lateral displacement to the probe beam via motion of the cantilever, and
    the processor is further configured to estimate the motion of the cantilever based on the lateral displacement of the probe beam.

17. The system of claim 12, wherein the processor is configured to estimate the lateral displacement with a standard deviation substantially equal to $W/\sqrt{M_s} \times 1/P\sqrt{T}$, where W is a bandwidth of the probe beam, $M_s$ is a number of orthogonal spatial modes in the probe beam, P is a power of the probe beam, and T is a time duration of the probe beam.

18. The system of claim 12, wherein the probe beam further includes a plurality of orthogonal temporal modes that are entangled with each other.

19. The system of claim 12, wherein:
    the probe beam further includes a plurality of orthogonal temporal modes that are entangled with each other, and
    the processor is configured to estimate the lateral displacement with a standard deviation substantially equal to $1/M_s \times 1/PT$, where $M_s$ is a number of orthogonal spatial modes in the probe beam, P is a power of the probe beam, and T is a time duration of the probe beam.

20. The system of claim 12, wherein the receiver includes:
    a sequence of mode-selective up-converters, each mode-selective up-converter from the sequence of mode-selective up-converters configured to extract a unique orthogonal spatial mode from the plurality of orthogonal spatial modes in the probe beam so as to measure the phase of that orthogonal spatial mode via homodyne detection.

21. The system of claim 12, wherein the transmitter includes:
    a stack of spatial-light modulators (SLMs) separated by an isotropic medium to generate an entangled squeezed light beam from a squeezed light beam; and
    an arbitrary waveform generator (AWG) configured to provide a displacement beam to be mixed with the squeezed light beam so as to generate the probe beam.

22. A method, comprising:
    sending, using a transmitter having a first pupil area $A_t$, a probe beam in a displaced squeezed state into a beam path that induces a lateral displacement to the probe beam, the probe beam including a plurality of orthogonal spatial modes and a plurality of orthogonal temporal modes, each spatial mode in the plurality of orthogonal spatial modes and each temporal mode in the plurality of orthogonal temporal modes being entangled with another mode in the plurality of orthogonal spatial modes and the plurality of orthogonal temporal modes;
    measuring a phase of each spatial mode and each temporal mode in the probe beam using a receiver having a second pupil area $A_r$, $A_t A_r/(\lambda L)^2$ being no less than 5, where $\lambda$ is a central wavelength of the probe beam and L is a length of the beam path; and
    estimating, using a processor, the lateral displacement of the probe beam based on the phase of each spatial mode and each temporal mode in the probe beam after the beam path to produce an estimation of the lateral displacement having a standard deviation substantially equal to $1/\sqrt{M_s} \times 1/PT$, where $M_s$ is a number of orthogonal spatial modes in the probe beam, P is a power of the probe beam, and T is a time duration of the probe beam.

* * * * *